(12) United States Patent
Ellery

(10) Patent No.: US 8,480,984 B2
(45) Date of Patent: Jul. 9, 2013

(54) BIOMASS BOILER SCR $NO_x$ AND CO REDUCTION SYSTEM

(75) Inventor: Robert Ellery, San Mateo, CA (US)

(73) Assignee: 2E Environmental, LLC, Modesto, CA (US)

( * ) Notice: Subject to any disclaimer, the term of this patent is extended or adjusted under 35 U.S.C. 154(b) by 0 days.

(21) Appl. No.: 13/527,047

(22) Filed: Jun. 19, 2012

(65) Prior Publication Data

US 2012/0255470 A1    Oct. 11, 2012

Related U.S. Application Data

(63) Continuation of application No. 13/164,249, filed on Jun. 20, 2011, now Pat. No. 8,211,391.

(60) Provisional application No. 61/357,235, filed on Jun. 22, 2010.

(51) Int. Cl.
| | |
|---|---|
| *B01D 53/56* | (2006.01) |
| *B01D 53/62* | (2006.01) |
| *B01D 53/74* | (2006.01) |
| *B01D 53/86* | (2006.01) |

(52) U.S. Cl.
USPC ............... 423/210; 423/215.5; 423/239.1; 423/247; 423/DIG. 6; 422/168; 422/177; 422/180

(58) Field of Classification Search
USPC ............... 422/168, 177, 180; 423/210, 215.5, 423/239.1, 247, DIG. 6
See application file for complete search history.

(56) References Cited

U.S. PATENT DOCUMENTS

| | | |
|---|---|---|
| 5,540,897 A | 7/1996 | Chu et al. |
| 6,027,697 A | 2/2000 | Kurihara et al. |
| 7,374,735 B2 | 5/2008 | Swanson et al. |
| 7,931,881 B2 | 4/2011 | Abrams et al. |
| 8,211,391 B2 * | 7/2012 | Ellery .......................... 423/210 |
| 2002/1505250 | 10/2002 | Hopkins et al. |
| 2004/0455513 | 3/2004 | McNertney, Jr. et al. |
| 2007/0116619 A1 * | 5/2007 | Taylor et al. ................. 423/210 |

OTHER PUBLICATIONS

Internationals Search Report and Written Opinion of the International Search Authority, or the Declaration mailed Oct. 27, 2011 for International Application No. PCT/US2011/041161.

* cited by examiner

*Primary Examiner* — Timothy Vanoy
(74) *Attorney, Agent, or Firm* — Barnes & Thornburg LLP

(57) ABSTRACT

A selective catalytic reduction system and method for reducing nitrogen oxide ($NO_x$) emissions comprising a boiler producing flue gas emissions, a particulate control device receiving flue gas emissions from the boiler, a selective catalytic reduction unit (SCR) receiving flue gas emissions from the particulate control device and reducing nitrogen oxide ($NO_x$) emissions, and a heat exchanger located downstream of the selective catalytic reduction unit (SCR) for removing heat from the flue gas for preheating at least one of boiler feed water and combustion air for the boiler.

14 Claims, 3 Drawing Sheets

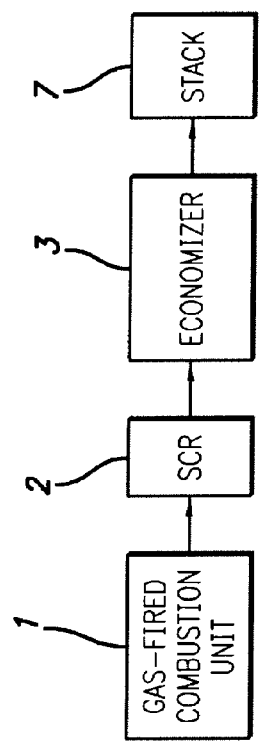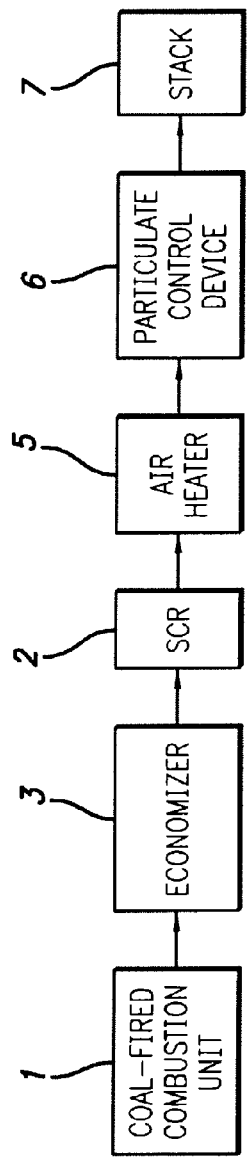

US 8,480,984 B2

BIOMASS BOILER SCR $NO_x$ AND CO REDUCTION SYSTEM

CROSS-REFERENCE TO RELATED APPLICATIONS

This is a continuation of prior U.S. application Ser. No. 13/164,249, filed Jun. 20, 2011 and now U.S. Pat. No. 8,211, 391, which claims benefit of the filing date U.S. Provisional Patent Application No. 61/357,235, filed on Jun. 22, 2010, the contents of both applications are hereby incorporated herein by reference.

BACKGROUND OF THE INVENTION

Many steam turbine apparatus are known for generating power. Today's power plants need to meet the growing demand for electricity while achieving efficient combustion, low emissions, and no net $CO_2$ releases into the environment. Biomass boilers equipped with new combustion techniques enhance efficiency, which, results in lower heat rates. Emissions control devices used with such boilers significantly reduce $NO_x$ and CO emissions so that higher energy demands can met.

BRIEF SUMMARY OF THE INVENTION

Selective Catalytic Reduction (SCR) (chemical reduction via a reducing agent and a catalyst) is utilized in large stationary fossil fuel combustion units such as electrical utility boilers, industrial boilers, process heaters, gas turbines, and reciprocating internal combustion engines to reduce nitrogen oxide ($NO_x$) emissions and carbon monoxide (CO) emissions. Nitrous oxide is a common $NO_x$ emission. SCR is capable of $NO_x$ reduction efficiencies in the range of 70% to 95% and CO reduction efficiencies in the range of 70% to 85%, and is effective only within a given temperature range. The optimum SCR operating temperature range varies from 480° F. to 800° F., depending on the type of catalyst used and the flue gas composition. The present invention is directed to selective catalytic reduction (SCR) systems and methods for reducing emissions (primarily $NO_x$) from large stationary solid fuel combustion units.

The SCR process chemically reduces the $NO_x$ molecule to nitrogen and water vapor and oxidizes the CO and $CO_2$ (carbon dioxide). A reagent such as ammonia or urea is injected into the ductwork, downstream of a combustion unit. For example, waste gas (also called flue gas) from a biomass boiler mixes with the reagent and enters a reactor module containing catalyst. The hot flue gas and reagent diffuse through the catalyst. The reagent reacts selectively with the $NO_x$ within a specified temperature range and in the presence of the catalyst and oxygen. The term "downstream" refers to processes that occur later on in the sequence of flue gas treatment beginning from flue gas creation in the biomass boiler and ending with the exit of the treated flue gas from the stack.

Temperature, the amount of reducing agent, injection grid design, and catalyst activity are factors that determine the removal efficiency of an SCR. The use of a catalyst results in two primary advantages of the SCR process over the selective non-catalytic reduction (SNCR) process: higher $NO_x$ control efficiency and reactions within a lower and broader temperature range. However, the benefits are accompanied by a significant increase in capital and operating cost. SNCR is a method to reduce $NO_x$ emissions by injecting, for example, ammonia or urea into the firebox of the boiler to react with the nitrogen oxides formed in the combustion process. This results in elemental nitrogen ($N_2$), carbon dioxide ($CO_2$), and water ($H_2O$).

SCR systems are sensitive to contamination and plugging (e.g., from contaminants in the untreated gas). Accordingly, SCR's may be tuned to remove contaminants. Part of tuning involves ensuring a proper distribution of ammonia in the gas stream and uniform gas velocity through the catalyst. Without tuning, SCRs can exhibit inefficient NOx reduction along with excessive ammonia slip due to not utilizing the catalyst surface area effectively. Ammonia slip is an industry term for ammonia passing through the SCR un-reacted. This occurs when ammonia is: over injected into gas stream, temperatures are too low for ammonia to react, or catalyst has degraded.

The present invention is directed to a selective catalytic reduction system and method for reducing nitrogen oxide ($NO_x$) emissions comprising a boiler producing emissions, a particulate control device receiving emissions from the boiler, a selective catalytic reduction unit (SCR) receiving emissions from the boiler and reducing nitrogen oxide ($NO_x$) emissions, and an heat exchanger located downstream of the selective catalytic reduction unit (SCR). The boiler may be of any type, e.g., wood-fired, coal-fired, etc. In one embodiment of the present invention (e.g., FIG. 2) the selective catalytic reduction unit operates at a higher temperature than if the air heater were located upstream of the selective catalytic reduction unit (SCR). In one embodiment (FIG. 6) the boiler includes an installed selective non-catalytic reduction (SNCR) system. In some embodiments (e.g., FIGS. 4-6) the selective catalytic reduction unit (SCR) operates without any of natural gas, a thermal heater and a reheater. In various embodiments an economizer may be advantageously located downstream of the selective catalytic reduction unit (SCR).

BRIEF DESCRIPTION OF THE DRAWINGS

FIG. 1 is a schematic showing flue-gas flow from a gas-fired combustion unit 1 to an SCR 2 located on the combustion unit 1, then to an economizer 3 located downstream of SCR 2 and to a stack.

FIG. 2 is a schematic showing flue-gas flow from a coal-fired combustion unit 1, to economizer 3, SCR 2 upstream of air heater 5 and particulate control device 6.

DETAILED DESCRIPTION OF THE INVENTION

Figure 3:
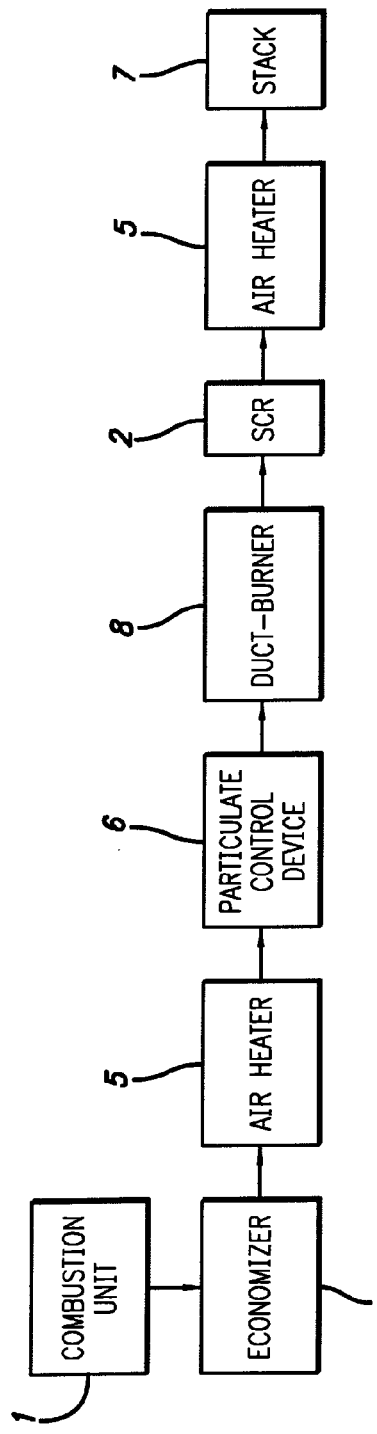
FIG. 3 is a schematic showing flue-gas flow from a combustion unit 1 to a downstream economizer 3, air heater 5, particulate control device 6, duct-burner 8, SCR 2 and air heater 5.

The present drawings demonstrate that there are several different locations downstream of the combustion unit 1 where SCR systems can be installed to effect the present invention. FIG. 1 shows a prior art gas-fired combustion unit 1 with an SCR located downstream. The remaining FIGS. (Nos. 2-6) show different embodiments including the present invention. For example, an SCR is located downstream of the coal-fired combustion unit 1 and economizer 3, and upstream of the air heater 5 and particulate control device 6 (hot-side)

as seen in FIG. 2. The flue gas in the locations shown in FIG. 1 and FIG. 2 is usually within the optimum temperature window for $NO_x$ and CO reduction reactions using metal oxide catalysts.

Solid biomass-fired combustion units 1 generate much more particulate matter (PM) than coal fired or liquid/gaseous fueled combustion units. PM creates fouling problems for SCRs, reducing catalyst life. In addition, the flue gas from biomass combustion units 1 contains certain impurities which attack the catalyst used in SCRs significantly reducing catalyst life and increasing operating (catalyst replacement) costs. As a result, SCRs for biomass combustion units 1 (see FIG. Nos. 3-6) are located downstream of the particulate control devices 6 (e.g., baghouse, dust collector or electrostatic precipitator (ESP)) so that flue gas is treated in the SCR after the PM has been removed.

FIG. 2 shows an exception wherein the SCR is located upstream of the particulate control device. The FIG. 2 exception is because of the flue gas characteristics from a coal-fired boiler (one type of solid fuel combustion unit) which do not foul SCR's to the extent and in the same manner as other types of solid biomass-fired boilers 1.

Figure 4:
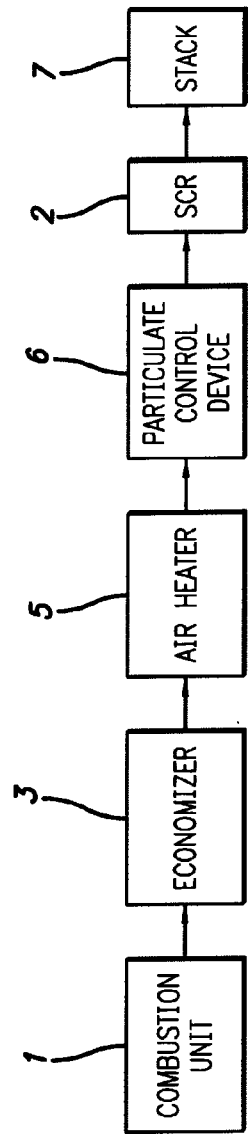
FIG. 4 is a schematic showing flue-gas flow from a combustion unit 1 to economizer 3, air heater 5, particulate control device 6 and SCR 2.
Figure 5:
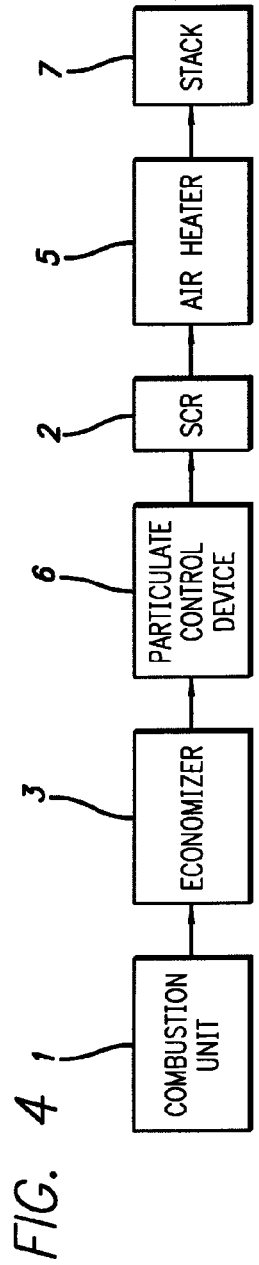
FIG. 5 is a schematic showing flue-gas flow from a combustion unit 1 to economizer 3, particulate control device 6 and SCR 2 followed by an air heater 5.

For solid biomass-fired combustion units 1 that utilize a baghouse for PM control, an SCR 2 can be added downstream of the baghouse 6 where temperatures could be as low as 320° F. A baghouse 6 has the ability to trap smaller particles and a larger amount of them on the bag compared to an ESP 6 so the catalyst manufacturers can use a smaller pitch on their catalyst charge. There are three primary types of baghouses, mechanical shaker, reverse air and reverse jet. Each baghouse type uses a bag for trapping and removing particulates in the flue gas. When particles are trapped on the bag, they will form a filter cake that will also trap a larger amount of the aerosol poisons in the flue gas before they reach the catalyst (catalyst will not deactivate as rapidly, so they can use a smaller catalyst volume). The main drawback of using a baghouse 6 is that operational temperatures are lower, so the catalyst would not be as active and more catalyst volume is needed. In FIG. 4 wherein the particulate control device 6 is, for example, a baghouse the flue gas leaving the baghouse 6 is in the range of 330° F. to 450° F. Flue gas in the range of 330° F. to 450° F. may be efficiently processed in the selective catalytic reduction unit (SCR) at these lower temperatures.

Solid biomass-fired combustion units 1 that utilize an ESP for PM control (mainly combustors with grates rather than fluid beds), can run at a higher temperature than a baghouse 6 which allows the catalyst to be more reactive, hence less catalyst. SCR's installed on solid biomass-fired combustion units with ESP's have increased flue gas temperature by re-heating the flue gas with fossil fuels or other waste heat. An additional heat exchanger is added downstream of the SCR 2 to capture the extra energy put into those systems, which makes these systems expensive to install and expensive to operate. As a result, few installations have been installed in the United States.

SNCR 4 (chemical reduction of $NO_x$ via a reducing agent) systems are used on a range of boiler configurations including: dry bottom wall fired and tangentially fired units, wet bottom units, stokers, and fluidized bed units. These units fire a variety of fuels such as coal, oil, gas, biomass, and waste. SNCR 4 is capable of $NO_x$ reduction efficiencies in the range of 30% to 50%, and is effective only within a given temperature range. The $NO_x$ reduction reaction occurs at temperatures between 1600° F. to 2100° F. SNCR 4 tends to be less effective at lower levels of uncontrolled NO and is better suited for applications with high levels of PM, such as biomass, in the waste gas stream than SCR 2.

SNCR 4 is based on the chemical reduction of the $NO_x$ molecule nitrogen ($N_2$) and water vapor ($H_2O$). A nitrogen based reducing agent such as ammonia or urea is injected into the post combustion flue gas. The reduction reaction with $NO_x$ is favored over other chemical reaction processes at temperatures ranging between 1600° F. and 2100° F.; therefore, it is considered a selective chemical process.

Both ammonia and urea are used as reagents. Urea-based systems have advantages over ammonia based systems because urea is non-toxic, less volatile liquid that can be stored and handled more safely. In addition, urea solution droplets can penetrate farther into the flue gas when injected into the boiler 1, enhancing the mixing with the flue gas which is difficult in large boilers. However, urea is more expansive than ammonia. The Normalized Stoichiometric Ratio (NSR) defines the ratio of reagent to NO required to achieve the targeted $NO_x$ reduction. In practice, more than the theoretical amount of reagent needs to be injected into the boiler flue gas to obtain a specific level of $NO_x$ reduction. This excess is referred to as ammonia slip. Ammonia slip may cause: 1) formation of ammonium sulfates, which can plug or corrode downstream components, 2) ammonia absorption into fly ash, which may affect disposal or reuse of the ash, and 3) increased plume visibility. As a result, facilities attempt to keep ammonia slip levels to less than 20 parts per million.

Figure 6:
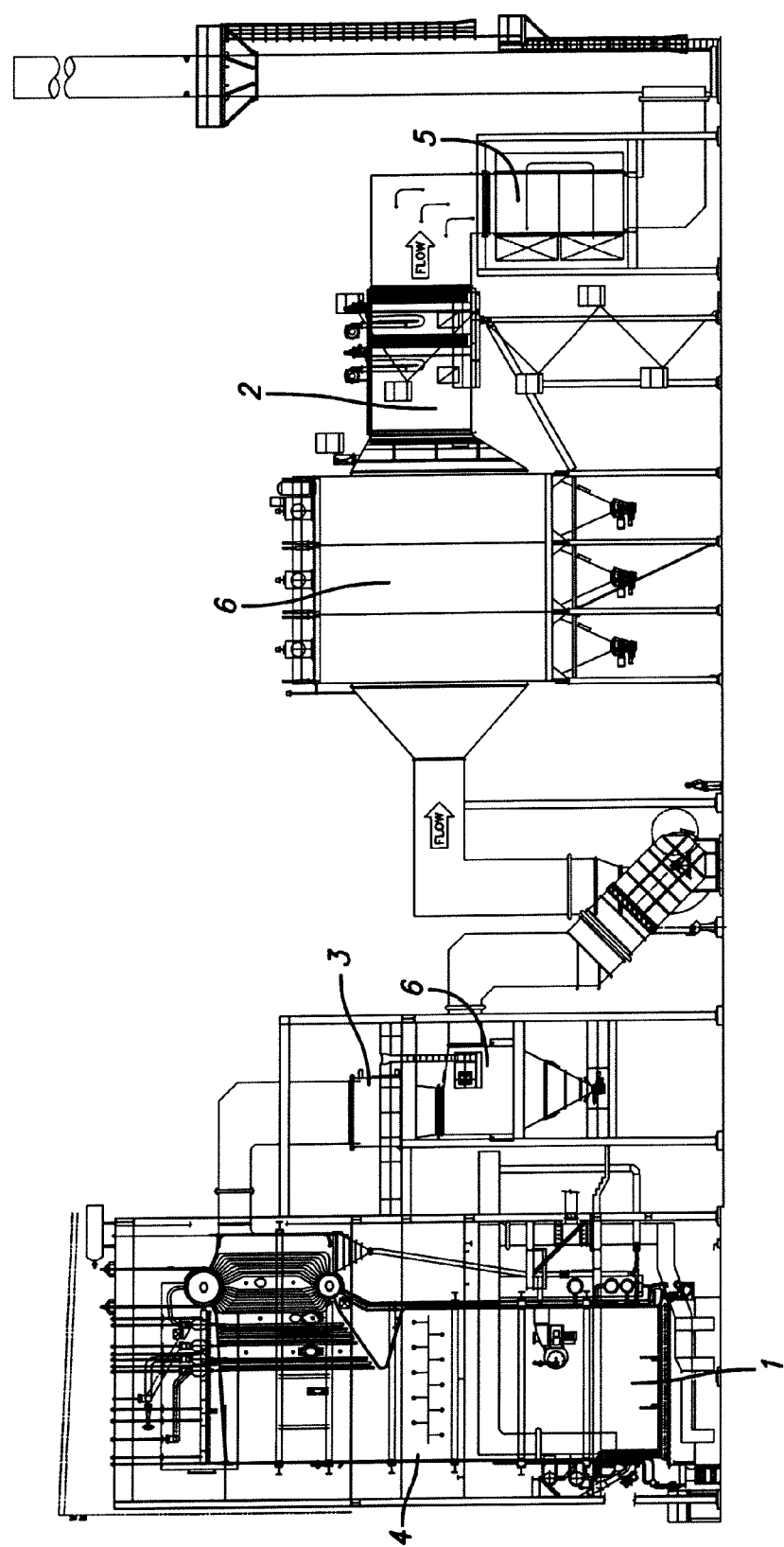
FIG. 6 is a right-side elevation drawing of a boiler 1 having an SNCR 4 and utilizing the present invention.

A hybrid SNCR/SCR $NO_x$ reduction system is a system (as seen in FIG. 6) that utilizes both types of $NO_x$ reduction technologies. Ammonia or urea is first injected into the post combustion flue gas in a SNCR system and then again upstream of an SCR 2 which is located downstream from the combustion unit 1. The ammonia slip from the SNCR system is utilized in the SCR 2. Additional ammonia or urea is added as necessary to achieve the desired $NO_x$ reduction. This type of hybrid system has been employed on fossil fuel combustion units but it does not appear to have been employed on any operating biomass combustion units 1.

In the disclosed embodiments the present invention enables the addition of an SCR 2 without the need to re-heat the flue gas. This eliminates the additional costly equipment necessary to re-heat the flue gasses and to capture the extra energy put into re-heating the flue gases.

The flue gas temperature exiting the biomass boiler 1 is in the range of 700° F. to 800° F. and is optimally about 750° F. To improve the efficiency of the biomass boiler 1, one or more heat exchangers 3, 5 are located downstream of the boiler 1 (see FIG. 3). Boiler feedwater is water used to supply (feed) a boiler to generate steam or hot water. Feedwater is usually stored, pre-heated and conditioned in a feedwater tank before being pumped to the boiler. One heat exchanger 3 is used to pre-heat the boiler feedwater and is referred to as economizer 3. The second heat exchanger 5 is utilized to pre-heat the combustion air in the boiler and is referred to as air heater or air pre-heater 5. The air pre-heater 5 removes heat from the flue gas, or combustion exhaust gas and uses that heat to heat the air entering the boiler. Both economizer 3 and air heater 5 are heat exchangers that take heat from the flue gas and use that heat for preheating of boiler feed water, combustion air, etc. For at least this reason economizer 3 and air heater 5 are interchangeable as seen in, for example, FIGS. 2-6. In FIG. 3 after exiting economizer 3 and air heater 5, the flue gas temperature may be in the 300° F. to 350° F. range, which is too cold for an effective SCR. The flue gases then enter one or more particulate control devices 6 such as mechanical dust collector, commonly referred to as a multiclone, baghouse or electrostatic precipitator (ESP). Utilizing the waste heat in the flue gas to pre-heat boiler feedwater and/or combustion air, improves the boiler efficiency while minimizing the cost of the particulate control devices due to the reduced volume of flue gases. A duct-burner 8 is a burner mounted in a duct or discharging into a duct and is used to heat air or flue gas in the duct. As seen in FIG. 3, duct-burner 8 heats the flue gas exiting the particulate control device 6 so that the flue gas is hot enough for treatment in SCR 2.

Due to the extremely high cost of the $NO_x$ emission reduction credits that would be required without an effective SCR, Applicant developed a hybrid SNCR/SCR $NO_x$ reduction system (see FIG. 6). This new system starts with a conventional SNCR system as described above. The biomass combustion unit process was improved by moving the air pre-heater 5 from its location downstream of the combustion unit and upstream of the particulate control device 6 to downstream of SCR 2 that would be located downstream from particulate control device 6. Placing air pre-heater 5 downstream of SCR 2 increases the flue gas temperature through SCR 2 to within the optimum temperature range (about 500° F. to 600° F.) for an SCR. It also increases the temperature of the flue gas entering particulate control device 6 (the mechanical dust collector and/or ESP) from the typical temperature of 300° F. to 600° F. or even slightly higher. The higher temperature results in a higher volume of airflow through those devices and thus increases their size and cost. However, the higher flue gas temperature reduces the amount of catalyst needed in SCR 2 which reduces the cost of SCR 2. One aspect of the present invention includes a determination of the optimum flue gas temperature (550° F.) that resulted in the lowest combined cost of the mechanical dust collector, ESP and SCR within an optimum temperature window for an effective SCR. Downstream of SCR 2 will be air pre-heater 5 which will lower the flue gas exit temperature to within a range of 300° F. to 350° F., which is acceptable for biomass boilers.

Locating one of the heat exchangers, e.g., air pre-heater 5 after SCR 2, enables the addition of a conventional high efficiency SCR without the use of re-heating the flue gas. That is, locating one of the heat exchangers, e.g., air pre-heater 5 (or economizer 3) after SCR 2, enables operation of the SCR 2 without having to heat the flue gas entering SCR 2 with natural gas, another thermal heater or a reheater. This results in a much more cost effective CO/NOx reduction system.

In order to simultaneously reduce CO and NOx emissions, the SNCR may need to be eliminated, or ammonia slip significantly minimized, because the ammonia slip from the SNCR will react with the CO catalyst and produce additional NOx. Thus, the NOx reduced by the SNCR system could be almost totally offset by NOx produced by the CO catalyst. Thus, the hybrid system is not utilized in those situations where NOx and CO reductions are required.

The present disclosure includes a right-side elevation drawing (FIG. 6) of biomass boiler utilizing a hybrid SNCR/SCR CO and NOx reduction system. The drawing shows that air pre-heater 5 has been moved from another location (either right before or right after economizer 3) and re-located after SCR 2, which is located after ESP 6. By relocating air pre-heater 5, the flue gas exit temperature entering SCR 2 will be in the range of 500° F. to 600° F. and preferably about 550° F. which is within an optimum temperature window for an effective SCR. The energy in the hot (e.g., 550° F.) flue gas will be extracted by air pre-heater 5 located downstream of SCR 2 and utilized to pre-heat combustion air for the boiler. The flue gases will exit the air pre-heater 5 at approximately 325° F., resulting in a boiler efficiency of approximately 77%. Capturing the energy from the hot flue gas in the air pre-heater in this manner allows the boiler to retain the same boiler efficiency as in any modern biomass boiler, without an SCR.

As noted above, the present SCR NOx and CO Reduction System does not require any additional equipment, other than the SCR. This results in significant cost reduction and savings.

While a preferred embodiment of the disclosure is shown and described, it is envisioned that those skilled in the art may devise various modifications and equivalents without departing from the spirit and scope of the disclosure as recited in the following claims. Although the present invention has been described and illustrated in detail, it is to be clearly understood that the same is by way of illustration and example only, and is not to be taken by way of limitation. The spirit and scope of the present invention are to be limited only by the terms of the appended claims.

The invention claimed is:

1. A selective catalytic reduction system for reducing nitrogen oxide ($NO_x$) emissions comprising
    a boiler producing flue gas emissions,
    a particulate control device receiving flue gas emissions from the boiler,
    a selective catalytic reduction unit (SCR) receiving 530°-600° F. flue gas emissions from the particulate control device that have not been heated subsequent to leaving the boiler, the SCR reducing nitrogen oxide ($NO_x$) emissions, and
    an injector combining at least one of the group consisting of ammonia and urea with the flue gas emissions for reaction with a catalyst in the SCR.

2. The selective catalytic reduction system of claim 1, wherein the flue gas temperature entering the selective catalytic reduction unit (SCR) is in the range of 540° F. to 560° F.

3. The selective catalytic reduction system of claim 1, wherein the particulate control device is a baghouse.

4. The system of claim 1, wherein the selective catalytic reduction unit (SCR) is operable to remove carbon oxide (CO) emissions.

5. A selective catalytic reduction system for reducing nitrogen oxide ($NO_x$) emissions comprising
    a boiler producing flue gas emissions,
    a particulate control device receiving flue gas emissions from the boiler,
    a selective catalytic reduction unit (SCR) receiving 530°-600° F. flue gas emissions from the particulate control device that have not been heated subsequent to leaving the boiler, the SCR reducing nitrogen oxide ($NO_x$) emissions, and
    wherein the boiler includes an installed selective non-catalytic reduction (SNCR) system.

6. The selective catalytic reduction system of claim 5, wherein the selective catalytic reduction unit (SCR) operates without any of a natural gas heater, a thermal heater and a reheater.

7. The selective catalytic reduction system of claim 5, wherein the flue gas temperature leaving the boiler is approximately 750° F.

8. A method for reducing nitrogen oxide (NOx) emissions comprising
    operating a boiler having an installed selective non-catalytic reduction (SNCR) system to produce heat and waste gas,
    removing particulates from the waste gas,
    after removing particulates, processing 530°-600° F. waste gas that has not been heated subsequent to leaving the boiler in a selective catalytic reduction unit (SCR) to remove nitrogen oxide (NOx) emissions.

9. The method of claim 8, wherein the waste gas exit temperature entering the selective catalytic reduction unit (SCR) is in the range of about 540° F. to 560° F.

10. The method of claim 8, further comprising capturing the energy from the hot waste gas in the heat exchanger which enables the boiler to retain the same boiler efficiency as in any modern biomass boiler, without an SCR.

11. The method of claim 8, wherein the selective catalytic reduction unit (SCR) removes carbon oxide (CO) emissions.

12. The method of claim 8, wherein removing particulates occurs in a baghouse.

13. The method of claim 8, wherein the processing of the waste gas in the SCR operates without any of natural gas, a thermal heater and a reheater.

14. The method of claim 8, further comprising combining at least one of the group consisting of ammonia and urea with the waste gas for reaction with a catalyst in the SCR.

* * * * *